US008230245B2

(12) United States Patent
Khatri et al.

(10) Patent No.: US 8,230,245 B2
(45) Date of Patent: Jul. 24, 2012

(54) METHOD AND SYSTEM FOR OPERATING-SYSTEM-INDEPENDENT POWER MANAGEMENT USING PERFORMANCE VERIFICATIONS

(75) Inventors: Mukund Khatri, Austin, TX (US);
Humayun Khalid, Austin, TX (US);
Robert W. Hormuth, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 640 days.

(21) Appl. No.: 12/321,675

(22) Filed: Jan. 23, 2009

(65) Prior Publication Data

US 2010/0191936 A1 Jul. 29, 2010

(51) Int. Cl.
*G06F 1/26* (2006.01)
(52) U.S. Cl. .......................... 713/320; 713/300; 713/310
(58) Field of Classification Search .................. 713/300, 713/310, 320
See application file for complete search history.

(56) References Cited

U.S. PATENT DOCUMENTS

| | | | |
|---|---|---|---|
| 6,457,135 B1 * | 9/2002 | Cooper .......................... | 713/323 |
| 6,587,950 B1 | 7/2003 | Shah et al. .................... | 713/300 |
| 6,704,687 B2 * | 3/2004 | Turicchi et al. ............... | 702/182 |
| 7,032,119 B2 | 4/2006 | Fung ............................. | 713/320 |
| 7,174,467 B1 | 2/2007 | Helms et al. .................. | 713/300 |
| 7,219,241 B2 | 5/2007 | Cooper et al. ................ | 713/310 |
| 7,228,441 B2 | 6/2007 | Fung ............................. | 713/300 |
| 7,287,153 B1 * | 10/2007 | Hamersley ........................ | 713/1 |
| 7,308,591 B2 | 12/2007 | Dubinsky ...................... | 713/324 |
| 7,330,988 B2 | 2/2008 | Golla et al. ................... | 713/322 |
| 7,689,851 B2 * | 3/2010 | Sawyers et al. ............... | 713/323 |
| 7,917,789 B2 * | 3/2011 | Fenger et al. ................. | 713/322 |
| 2002/0194509 A1 * | 12/2002 | Plante et al. .................. | 713/300 |
| 2004/0268166 A1 * | 12/2004 | Farkas et al. ................. | 713/320 |
| 2005/0262365 A1 * | 11/2005 | Lint et al. ...................... | 713/300 |
| 2006/0181949 A1 | 8/2006 | Kini ......................... | 365/230.03 |
| 2007/0011480 A1 * | 1/2007 | Banginwar et al. ........... | 713/323 |
| 2007/0220294 A1 | 9/2007 | Lippett ......................... | 713/320 |
| 2007/0283176 A1 * | 12/2007 | Tobias et al. .................. | 713/322 |
| 2007/0300085 A1 * | 12/2007 | Goodrum et al. ............. | 713/300 |
| 2008/0098194 A1 | 4/2008 | Hashimoto et al. ........... | 711/173 |
| 2008/0104430 A1 * | 5/2008 | Malone et al. ................ | 713/300 |
| 2008/0235364 A1 * | 9/2008 | Gorbatov et al. ............. | 709/224 |
| 2009/0307509 A1 * | 12/2009 | Jenne ............................ | 713/322 |
| 2010/0122101 A1 * | 5/2010 | Naffziger et al. ............. | 713/340 |
| 2010/0169692 A1 * | 7/2010 | Burton .......................... | 713/340 |

OTHER PUBLICATIONS

Hewlett-Packard Development Company, L.P., "*Integrated Lights-Out technology:enhancing the manageability of ProLiant servers,*" Technology Brief, 6th edition, TC070806TB, Aug. 2007.

(Continued)

*Primary Examiner* — Nitin Patel
*Assistant Examiner* — Zahid Choudhury
(74) *Attorney, Agent, or Firm* — O'Keefe, Egan, Peterman & Enders, LLP

(57) ABSTRACT

Systems and methods are disclosed for power management in information handling systems using processor performance data to validate changes to processor performance states. Processor utilization data and processor performance data is obtained during system operation. The processor utilization data is analyzed to determine a desired performance state for the processor. Before setting the actual performance state of the processor to this desired performance state, however, processor performance data is analyzed to determine if prior changes to the performance state have been effective. The performance state of the processor is then changed are maintained based upon this additional performance verification analysis.

29 Claims, 4 Drawing Sheets

OTHER PUBLICATIONS

Hewlett-Packard Development Company, L.P., "*Power Regulator for ProLiant servers*," Technology Brief, 3rd edition, TC070202TB, Feb. 2007.

Hewlett-Packard Development Company, L.P., "*HP Insight Power Manager 1.4*," QuickSpecs, DA—12623, North America—Version 9, Jun. 2008.

* cited by examiner

METHOD AND SYSTEM FOR OPERATING-SYSTEM-INDEPENDENT POWER MANAGEMENT USING PERFORMANCE VERIFICATIONS

TECHNICAL FIELD

The techniques described herein relate to systems and methods for power management for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For many information handling systems, it is desired to operate the system, at acceptable performance levels, using as little power as possible in order to extend battery life, reduce heat, and/or simply to reduce power usage. To this end, in order to reduce power usage, many systems control the performance states for CPUs (central processing units) and control other power using devices within the system such as controlling fan speed for cooling fans. Prior systems have used CPU utilization parameters (and many different variants of CPU utilization parameters exist) in determining the performance state in which to operate a CPU while still providing adequate CPU speed to the system. In many systems, the operating system is entity within the system that will determine CPU utilization and then set the performance state for the CPU.

Many users, and enterprise users in particular, are increasingly struggling with the growing demands of providing enough compute cycles at the expense of power and cooling. Most enterprise users have one of two primary problems: (1) insufficient power to add new computing infrastructure, and/or (2) insufficient cooling to add new computing infrastructure. Balancing server performance dynamically to the workload, therefore, is in integral part of simplifying IT (information technology) management and easing the power and cooling challenge. To balance server performance, it is desirable to manage the performance state of the CPUs within the information handling systems being operated as part of the enterprise server and data centers.

The ACPI (Advanced Configuration and Power Interface) standard used in many information handling systems supports multiple processor power states (C0, C1, C2 . . . ) and multiple processor performance states (P0, P1 . . . Pn) for these power states. The power states and the performance states can then be used to manage the power consumed by a CPU during operation of the system. Traditionally, the operating system continuously monitors the load on the processor and puts the processor in a power state and a performance state accordingly. This existing ACPI method for CPU power management is standardized and proven to be helpful in power management. However, the operating system has very limited knowledge of the system's thermal/mechanical characteristics and also will not be able to individually control fans based on the load on specific processors in a multi processor environment.

Some information handling systems support the simultaneous operation of multiple operating systems. These operating systems can be multiple instances of the same operating system and/or multiple different operating systems. In these multiple operating system environments, a hypervisor is often used to provide an interface between the multiple operating systems and the underlying hardware of the system. A hypervisor is a virtualization layer that allows multiple operating systems to run on a host system at the same time. The hypervisor also operates to intercept power control interrupts from each operating system as each operating system may separately attempt to control performance states for the CPU without knowing the needs of the other operating systems. The hypervisor cannot effectively handle the power management, however, due to the complexity of attempting to manage CPU utilization needs across multiple operating systems.

As virtualization continues to find its way into data centers, end users are able to benefit with server consolidation and increased drive server utilization. However, in doing so, end users also have to give up power management of those servers. This occurs due to the multiple operating systems making different performance requests to manage the power that the hypervisor must trap and ignore due to the conflicting performance state (PSTATE) requests. For example, consider a server with four active operating systems and an overlying hypervisor. If the first operating system (OS1) requests a first PSTATE (P0), the second operating system (OS2) requests a second PSTATE (P1), the third operating system (OS3) requests a third PSTATE (P2), and the fourth operating system (OS4) requests a fourth PSTATE (P3), the hypervisor must decide what to do with these disparate PSTATE requests. Due to these conflicts, the hypervisor will typically ignore the OS requests and run the machine in the top PSTATE (P0) at all times. This approach, however, can significantly negate some of the positive gains of consolidation and virtualization, particularly where power management is concerned.

Because of these difficulties in managing performance state requests from multiple operating systems running underneath a hypervisor, it has been proposed that the BIOS (basic input output system) for the information handling system operate to control the performance states for the CPU based upon information obtained from the underlying hardware. This BIOS approach, however, can suffer from a disconnect from the performance needs and results of the operating systems running on the system.

FIG. 1A (Prior Art) is a block diagram of a prior system for managing performance states for an information handling system 100. The information handling system 100 includes hardware 104 and BIOS (basic input output system) 102. The hardware 104 can include, for example, a CPU (central processing unit) 106 and a fan 108, but other hardware devices can also be provided within the system 100. The information handling system 100 can also include a hypervisor 110 that operates to provide an interface between a plurality of operating systems (OS1, OS2, ... OS(N)) 112, 114 ... 116 and the system BIOS 102 and hardware 104. It is further noted that the system 100 can include multiple CPUs and/or multiple fans, as desired, and each CPU can further include one or more processing cores or threads.

The information handling system 100 uses power as it operates. To reduce this power usage, the CPU 106 can be run in lower performance states, and the fan can be run at lower speeds. The performance state for the CPU and the speed for the fan can be controlled by a power control signals 124 provided by the BIOS 102. The performance state for the CPU 106 typically needs to be fast enough to meet the user processing needs for the CPU 106. To determine the utilization of the CPU 106 by the system 100, the BIOS 102 can issue a system management interrupt (SMI) 122 to the CPU 106 and obtain CPU utilization data 120 from the CPU 106. Using this information, the BIOS 102 can set a desired performance state for the CPU 106 through the power control signals 124. It is also noted that the fan speed can be set using temperature readings from temperature sensors within the system 100, if desired.

FIG. 1B (Prior Art) is a process flow diagram for the system of FIG. 1A (Prior Art). In the process 150 depicted, utilization data is obtained in block 152 by the BIOS. And in block 154, the CPU performance state is set by the BIOS based upon an analysis of the utilization data. The utilization data can include information such as the CPU load that can be obtained from the CPU 106 through an SMI request.

Unfortunately, these prior techniques for controlling the performance states of CPUs within a system can lead to inefficient and ineffective changes to the performance states. The CPU utilization values can also be inaccurately interpreted since a CPU may report itself as busy even though it is actually busy waiting for the data from memory or any I/O (input/output) device before it can proceed with the number crunching.

SUMMARY

Systems and methods are disclosed for power management in information handling systems using processor performance data to validate changes to processor performance states. Processor performance data, including processor utilization data, is obtained during system operation. This data is analyzed to determine a desired performance state for the processor. Before setting the actual performance state of the processor to this desired performance state, however, processor performance data is analyzed to determine if prior changes to the performance state have been effective. The performance state of the processor is then changed or maintained based upon this additional performance verification analysis. As described below, other features and variations can be implemented, as desired, and a related methods and systems can be utilized, as well.

DESCRIPTION OF THE DRAWINGS

It is noted that the appended drawings illustrate only exemplary embodiments of the techniques described herein and are, therefore, not to be considered limiting of its scope, for the invention may admit to other equally effective embodiments.

DETAILED DESCRIPTION OF THE INVENTION

Figure 1A:
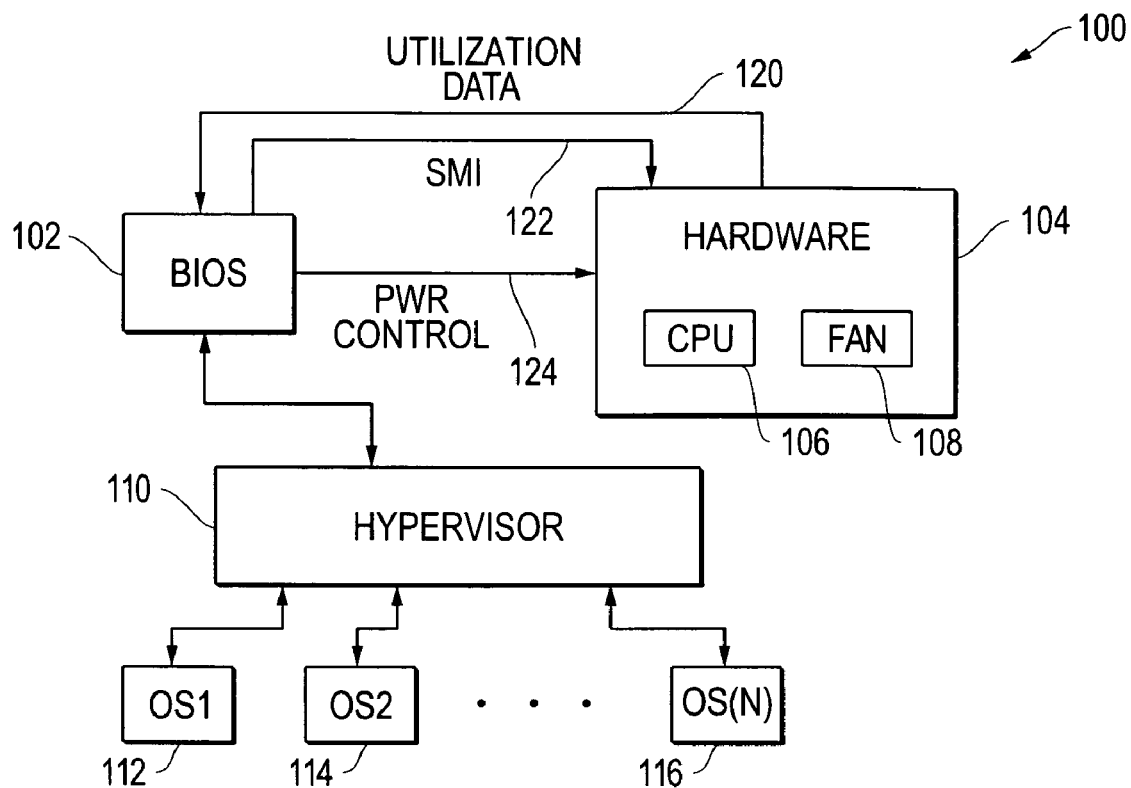
FIG. 1A (Prior Art) is a block diagram of a prior system for managing performance states for an information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As described herein, systems and methods provide for power management in information handling systems using processor performance data to validate changes to processor performance states. As such, before setting the actual performance state of the processor to a new performance state, processor performance data is analyzed to determine if prior changes to the performance state have been effective. And performance states are adjusted accordingly. Other features and variations can be implemented, as desired, and a related methods and systems can be utilized, as well.

As described above, as virtualization grows, power management problem grows for systems having multiple operating systems and an overlying hypervisor. As described herein, to work around these problems, power is accurately managed for the system underneath the hypervisor to achieve a desired and/or optimal performance-per-watt (Perf/Watt) for a given system. For example, fan power can become very non-linear with fan speed. Increasing the CPU (central processing unit) performance state so that it drives fan power to its non-linear region may not be the best performance-per-watt. Likewise, memory power can become a dominant percentage of the system power in large memory configurations with virtualization, and thus the memory bandwidth can be modulated to stay within the confines of a desired performance-per-watt. Still further, the CPU performance states can be managed with a view of how past changes to performance states have affected performance.

To achieve better power management, and as described herein, a method is implemented that utilizes the system BIOS (Basic Input Output System) and the system BMC (board management controller) to make platform power management decisions underneath the operating system and hypervisor. At a high level, to accomplish this power management, the power management system can be configured to analyze system performance data before allowing a change to the performance state of the processor based upon prior analysis of processor utilization data. In one implementation, a variable based SMI (System Management Interrupt) can be used to obtain this performance data from the CPU. The BIOS can be configured to read a series of registers inside the CPU to determine CPU utilization and performance data. In addition, the BMC can be configured to read other system variables, such as fan speed, PSU (power supply unit) power, memory bandwidth, temperature, air flow, and/or other desired system operational parameters. The BIOS and BMC can then operate to determine the desired performance state setting for the system in order to achieve a desired and/or optimal performance-per-watt for the system. It is further noted that other service processors or devices can also be used in combination with or instead of the BIOS and BMC to implement the power management system for the information handling system.

The systems and methods described herein take a holistic view of system performance, rather than CPU utilization by itself as in several Prior Art solutions, to achieve the desired and/or best performance-per-watt for the system. System performance is managed underneath the operating system and hypervisor by monitoring the performance and power of the CPU. In addition, various other hardware resources can also be monitored, such as fans, power supply, memory, IO (input/output) subsystems, system voltage regulators and/or other desired hardware resources. As such, the systems and methods described herein can improve and/or optimize performance-per-watt across workloads by directly controlling one or more of these hardware components without direct involvement by the OS or the hypervisor. Components utilized within the system embodiments disclosed below include software modules and/or firmware operating on the system BIOS, the BMC and/or other service processors or devices. As described in more detail below, one or more of the following features, as well as other features if desired, can be implemented as part of this power management system:

Variable SMI rate—Rate of SMI requests varies with CPU utilization.

Variable PSTATE—Adjustments using slope approximation (y=mx+b) that adjusts the slope (m) over time.

UNHALTED cycle count—UNHALTED cycle count used as indication of utilization. Different work loads will have a different min/max UNHLATED cycle count due to different instruction mixes. Using this parameter helps to narrow the range between PSTATES.

IPC (Instructions per cycle) count—IPC can be used as performance data to indicate whether a change in PSTATEs is actually improving the CPU performance or not. Many times a CPU frequency increase does not help system performance due to a bottleneck elsewhere in the system, e.g., CPU could be starved for memory. After PSTATE change, IPC can be check next time around by the algorithm to see if the impact on IPC was positive or negative from the change. Subsequent changes to the PSTATE can then be adjusted accordingly for finer grain control.

Memory bus transaction counter—The bus transaction counter can be used to bound the memory bandwidth (BW) and memory latency needs.

Power Capping collaboration with BIOS/BMC interaction—Power capping collaboration with BIOS/BMC interactions allows a platform level power cap to be placed on the platform by the BMC (board management controller) via an external management console. When this power cap is applied, the BMC communicates limits to the system BIOS that is implementing the dynamic perf/watt tuning, thus allowing the BIOS to still perform perf/watt tuning but under a limit. Thus, the BIOS can uses Pstates, memory, IO, fan, etc. as knobs to stay under the power cap but at the most efficient setting possible.

Example embodiments using performance data to validate or verify changes to the performance states of processors will now be described with respect to FIGS. 2A, 2B, 3 and 4 below. In addition to these embodiments, other features and variations can be implemented, as desired, and a related methods and systems can be utilized, as well.

Figure 2A:
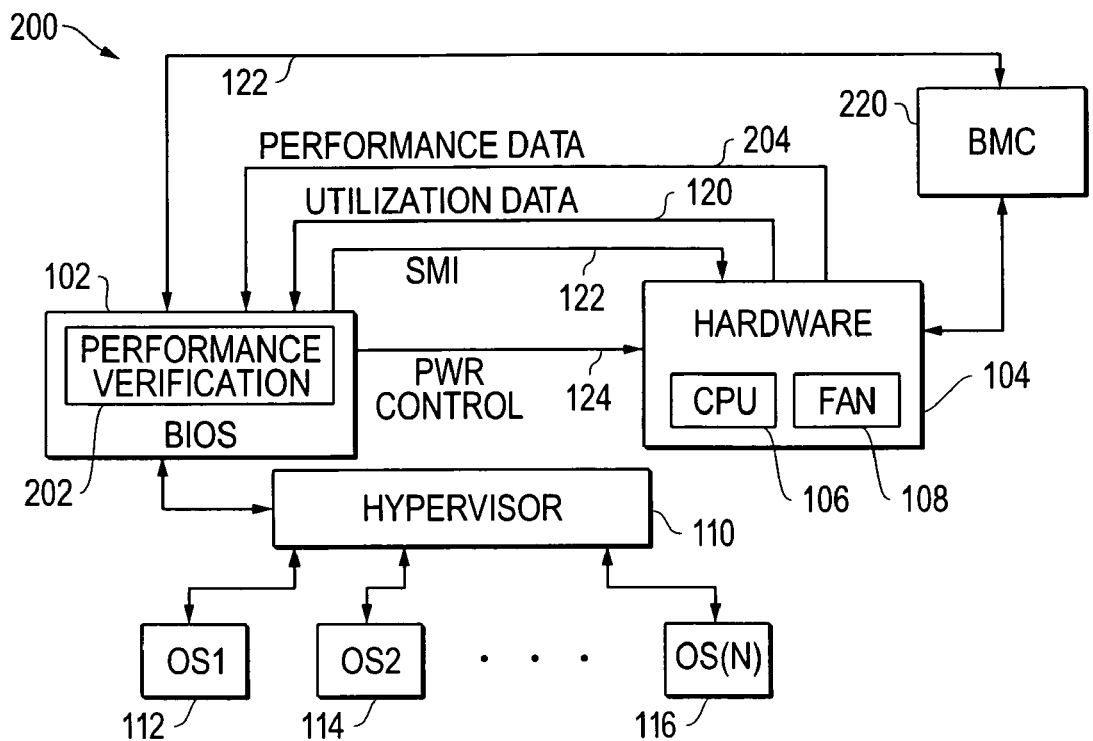
FIG. 2A is a block diagram of an embodiment for managing performance states for an information handling system including performance verifications for changes to performance states.

FIG. 2A is a block diagram of an embodiment for managing performance states for an information handling system 200 including performance verifications for changes to performance states. As with the system 100 of FIG. 1A (Prior Art), the information handling system 200 includes hardware 104 and BIOS (basic input output system) 102. The hardware 104 can include, for example, one or more CPUs (central processing units) 106 and one or more fans 108. Other hardware devices can also be included with the system 200. The information handling system 200 can also include a hypervisor 110 that operates to provide an interface between a plurality of operating systems (OS1, OS2, . . . OS(N)) 112, 114 . . . 116 and the system BIOS 102 and hardware 104.

The information handling system 200 uses power as it operates, as does system 100 of FIG. 1A (Prior Art). To reduce this power usage, the CPU 106 can be run in lower performance states, and the fan can be run at lower speeds. The performance state for the CPU and the performance state for the fan can be controlled by a power control signals 124 provided by the BIOS 102 or other device within the system. The performance state for the CPU 106 typically needs to be fast enough to meet the utilization needs for the CPU 106. To determine the utilization of the CPU 106 by the system 100, the BIOS 102 can issue a request through the system management interrupt (SMI) bus 122 to the CPU 106 and obtain CPU utilization data 120 from the CPU 106. Using this information, the BIOS 102 can set a desired performance state for the CPU 106 through the power control signals 124. It is also noted that the fan speed can be set using temperature readings from temperature sensors within the system 100, if desired.

Information handling system 200, in contrast with system 100 of FIG. 1A (Prior Art), also includes a performance verification module 202 within the BIOS 102. This performance verification module 202 obtains performance data 204 from the CPU 106 through a request using the SMI bus 122. The performance verification module 202 then uses this performance data 204 to determine how prior changes in the performance states of the CPU affected the performance of the CPU. Based upon this performance evaluation, the BIOS decides whether or not to make a change to the performance state based upon the utilization data 120. It is further noted that the BIOS need not be the agent operating to implement the power management as described herein. A different device or agent operating within the system could be used instead while still taking advantage of the performance verification techniques described herein. Still further, it is noted that the CPU itself could run the performance verification module 202 and perform the related power management control of itself.

As also indicated above, a BMC (board management controller) 220 can also be provided, for example, in server systems. The BMC 220 can be coupled to the hardware 104 to obtain information related to the operation of the hardware resources, such as the CPU 106 and/or the fan 108. The BMC 220 can then communicate with the BIOS 202 through connections 222 to implement the techniques discussed herein. It is noted that the BIOS alone, the BMC alone or the BIOS and the BMC together can be configured to implement the methods and systems described herein for using utilization and performance data to manage the power usage of information handling systems. It is further noted that a separate device or processor, other than the BIOS or BMC, could be used in combination with or instead of the BIOS and BMC, as desired, while still taking advantage of the performance verification techniques described herein using performance data to verify adjustments to CPU performance states during operation of the information handling system.

Figure 1B:
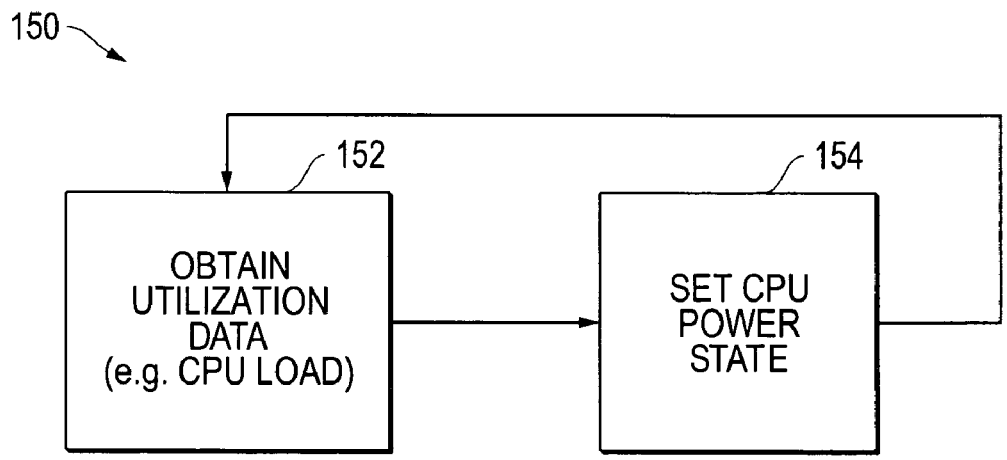
FIG. 1B (Prior Art) is a process flow diagram for the system of FIG. 1A (Prior Art).
Figure 2B:
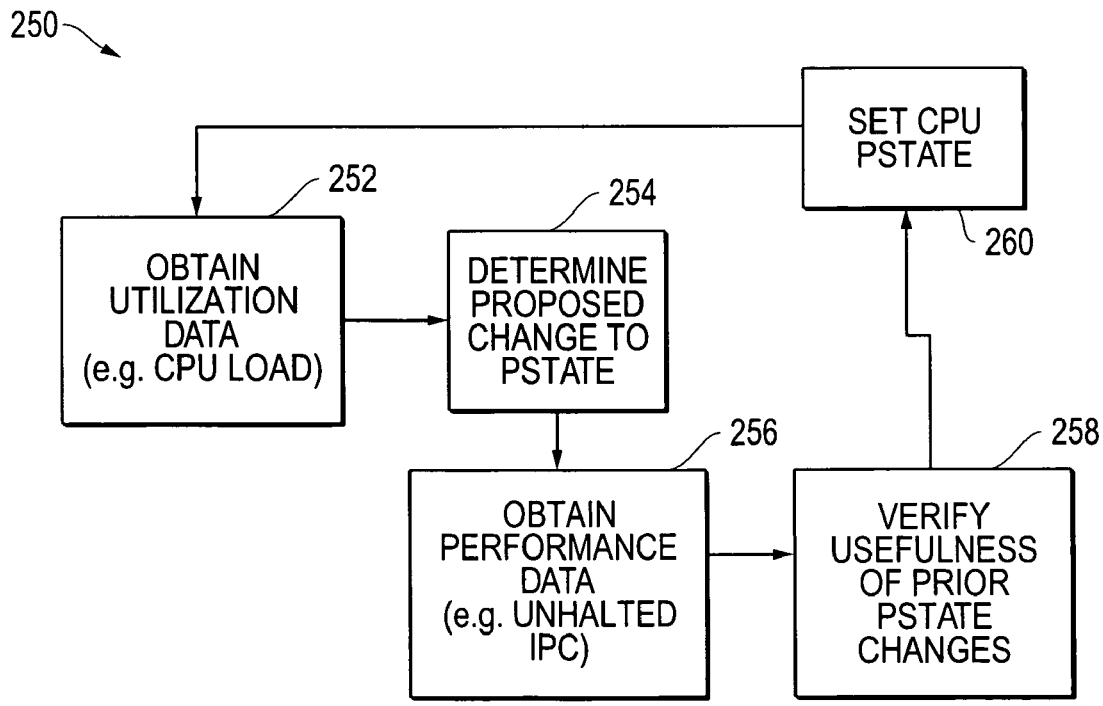
FIG. 2B is a process flow diagram for the system of FIG. 2A.

FIG. 2B is a process flow diagram for the system of FIG. 2A. In the process 250 depicted, utilization data is obtained in block 252, for example, by the BIOS. The utilization data can include information such as CPU load or utilization that can be obtained from the CPU 106 through an SMI request. In block 254, a determination is made as to a proposed change to the performance state of the CPU. Next, in contrast to the process 150 of FIG. 1B (Prior Art), performance data for the CPU is obtained in block 256, for example, by the BIOS. This performance data can include a wide variety of information concerning the performance of the CPU. Many CPUs have performance counters that track a wide variety of performance parameters, and these parameters can be used as performance data. For example, information concerning the percentage of unhalted versus halted cycles (UNHALTED) for the CPU can be obtained and instructions-per-second (IPC) for the CPU can be obtained. Bus utilization (e.g., memory and IO transactions) can also be used. In block 258, the performance data is utilized to verify the usefulness of prior performance state changes. Based upon this performance verification, the CPU performance state is then adjusted in block 260.

As indicated above, software or firmware modules operating on the BIOS, the BMC and/or other devices or systems within the information handling system can be used alone or in combination to implement the process 250. It is further noted that one or more CPUs may be used in the system and that multi-core and/or multi-thread processors can be used. If desired, accurate utilization data can be obtained from each of the CPUs in the system in order to make a determination of how to set the performance states for the CPUs. It is also noted that the hypervisor, if desired, could operate the performance verification module 202 and perform the process 250 of FIG. 2B. Still further, it is noted that other variations could also be implemented while still taking advantage of the performance verification process as described herein prior to actual implementation of performance state changes indicated by looking at CPU utilization information alone.

Figure 3:
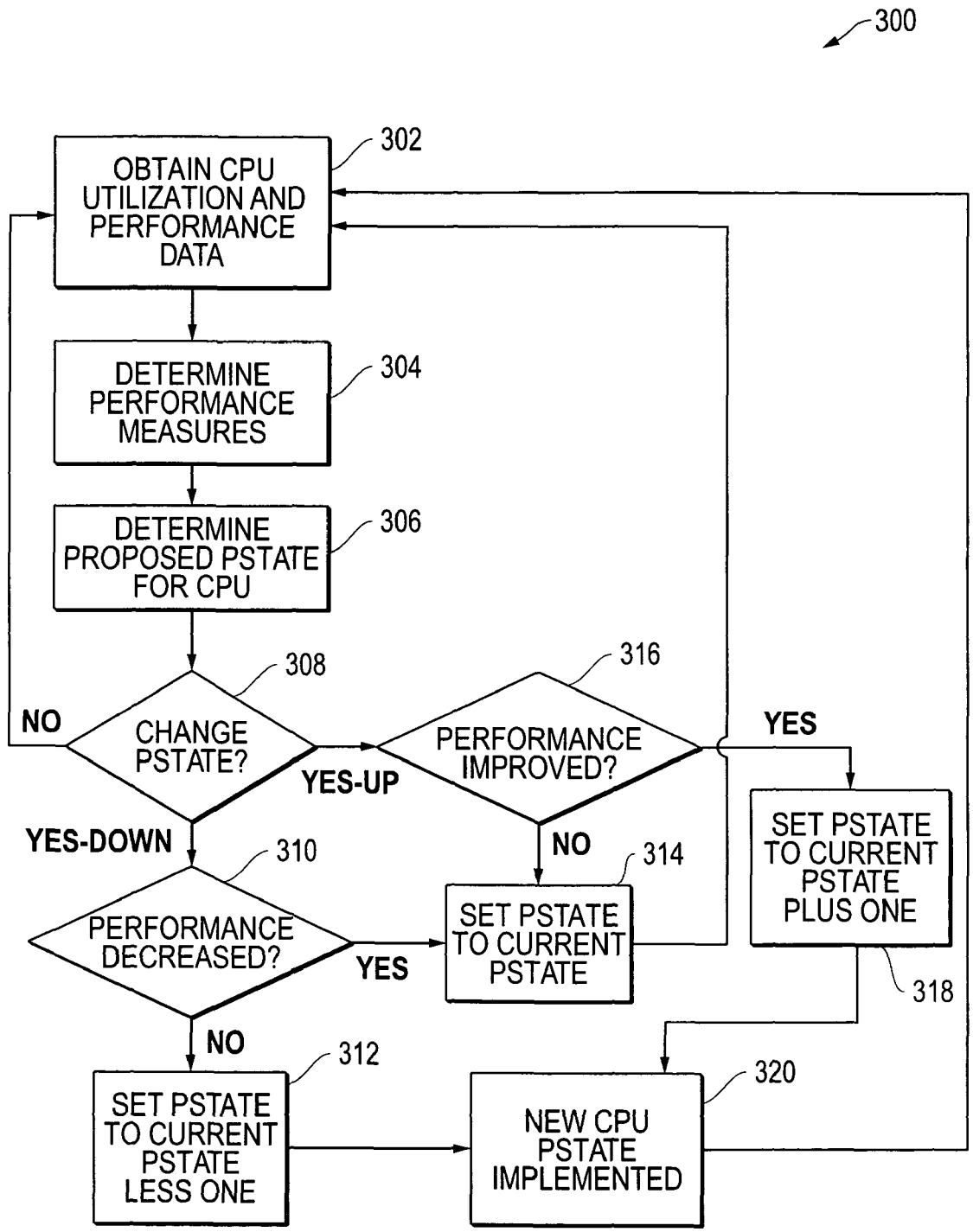
FIG. 3 is a more detailed process flow diagram for managing performance states including performance verifications.

FIG. 3 is a more detailed process flow diagram for an embodiment 300 for managing performance states including performance verifications. In block 302, utilization data and performance data is obtained from the CPU. In block 304, performance measures are determined using the performance data. Next, in block 306, a determination is made concerning the proposed performance state (PSTATE) for the CPU based upon the utilization data. Decision block 308 is then reached where a determination is made concerning whether on not a change is being proposed for the performance state (PSTATE) of the CPU. If "NO," flow passes back to block 302. If "YES," then flow passes to determination block 316 if a move up (YES-UP) in the performance state is indicated and to determination block 310 if a move down (YES-DOWN) in the performance state is indicated.

When determination block 310 is reached from determination block 308, a determination is made concerning whether CPU performance has decreased since the last PSTATE change. If "NO," then flow passes to block 312 where the performance state (PSTATE) is set to the current performance state (PSTATE) less one, unless the lowest performance state has already been reached. Flow then passes to block 320 where the performance state (PSTATE) for the CPU is implemented through control signals to the CPU. If the determination is "YES" in block 310, then flow passes to block 314 where the performance state (PSTATE) for the CPU is left at its current state without the proposed reduction. Flow then passes back to block 302.

When determination block 316 is reached from determination block 308, a determination is made concerning whether CPU performance has improved since the last PSTATE change. If "YES," then flow passes to block 318 where the performance state (PSTATE) is set to the current performance state (PSTATE) plus one, unless the highest performance state has already been reached. Flow then passes to block 320 where the performance state (PSTATE) for the CPU is implemented through control signals to the CPU. If the determination is "NO" in block 318, then flow passes to block 314 where the performance state (PSTATE) for the CPU is left at its current state without the proposed reduction. Flow then passes back to block 302.

For the determinations in block 316 and block 310, a variety of performance data can be utilized. For example, instructions-per-cycle (IPC) for the CPU can be compared over time and utilized to make these determinations. IPC is a computation of instructions-per-cycle, and can be implemented by looking at count of RETIRED instructions over a selected period of time. RETIRED instructions are those that the CPU completes in the period of time.

When utilization and performance data is obtained, the current value, the minimum value over time, the maximum over time and the average value can be determined and stored. As such, block 306 can be implemented, for example, by adjusting the PSTATEs to approximate a linear response between the minimum value and the maximum value for the utilization measure. For example, an equation that can be utilized for this analysis is as follows:

$$PSTATE = ROUND\{[(P_{MAX}-P_{MIN})/(MAX\_UTIL-MIN\_UTIL)]*CPU\_UTIL+P_{MIN}\}$$

In this equation, the MAX_UTIL and MIN_UTIL values represent the maximum and minimum utilization data for the parameter being used to adjust PSTATEs. CPU_UTIL represents the current CPU utilization. $(P_{MAX}-P_{MIN})/(MAX\_UTIL-MIN\_UTIL)$ represents the slope of a y=mx+b function where y is the PSTATE, m is the slope, b is the y-axis intercept, and x is CPU utilization. The ROUND function allows this equation to generate a star-step solution. As described in more detail below, the MAX_UTIL and MIN_UTIL values can be fixed or can change dynamically as the system operates.

Alternatively, or in additionally, a predetermined utilization level can be used to determine the next PSTATE. For example, the following equation can be utilized:

$$PSTATE_{TARGET} = PSTATE_{CURRENT}*CPU\_UTIL_{CURRENT}/CPU\_UTIL_{TARGET}$$

In this equation, $PSTATE_{TARGET}$ is the target performance state; $PSTATE_{CURRENT}$ is the current performance state;

$CPU\_UTIL_{CURRENT}$ is the current utilization percentage; and $CPU\_UTIL_{TARGET}$ is the target utilization rate. In operation, this target utilization rate ($CPU\_UTIL_{TARGET}$) can be a fixed value or can be varied over time, as desired. A typical value that can be utilized for the target utilization rate ($CPU\_UTIL_{TARGET}$) is, for example, 80 percent. In effect, using this predetermined utilization level, the target performance state ($PSTATE_{TARGET}$) is being selected to drive the utilization of the CPU/core to the target utilization rate ($CPU\_UTIL_{TARGET}$). In this way, the CPU/core is kept running at a high utilization at a lowest possible performance state and power state while maximizing the amount of sleep/idle time for that CPU/core.

It is further noted that the CPU utilization can be determined and controlled in a variety of ways. For example, CPU utilization can be determined for individual CPUs (or sockets) or individual cores within a multi-core CPU. If desired, CPU utilization can also be determined by averaging CPU utilization across multiple sockets and/or multiple cores. In this way, CPUs and cores can be managed individually or collectively or both, as desired.

Figure 4:
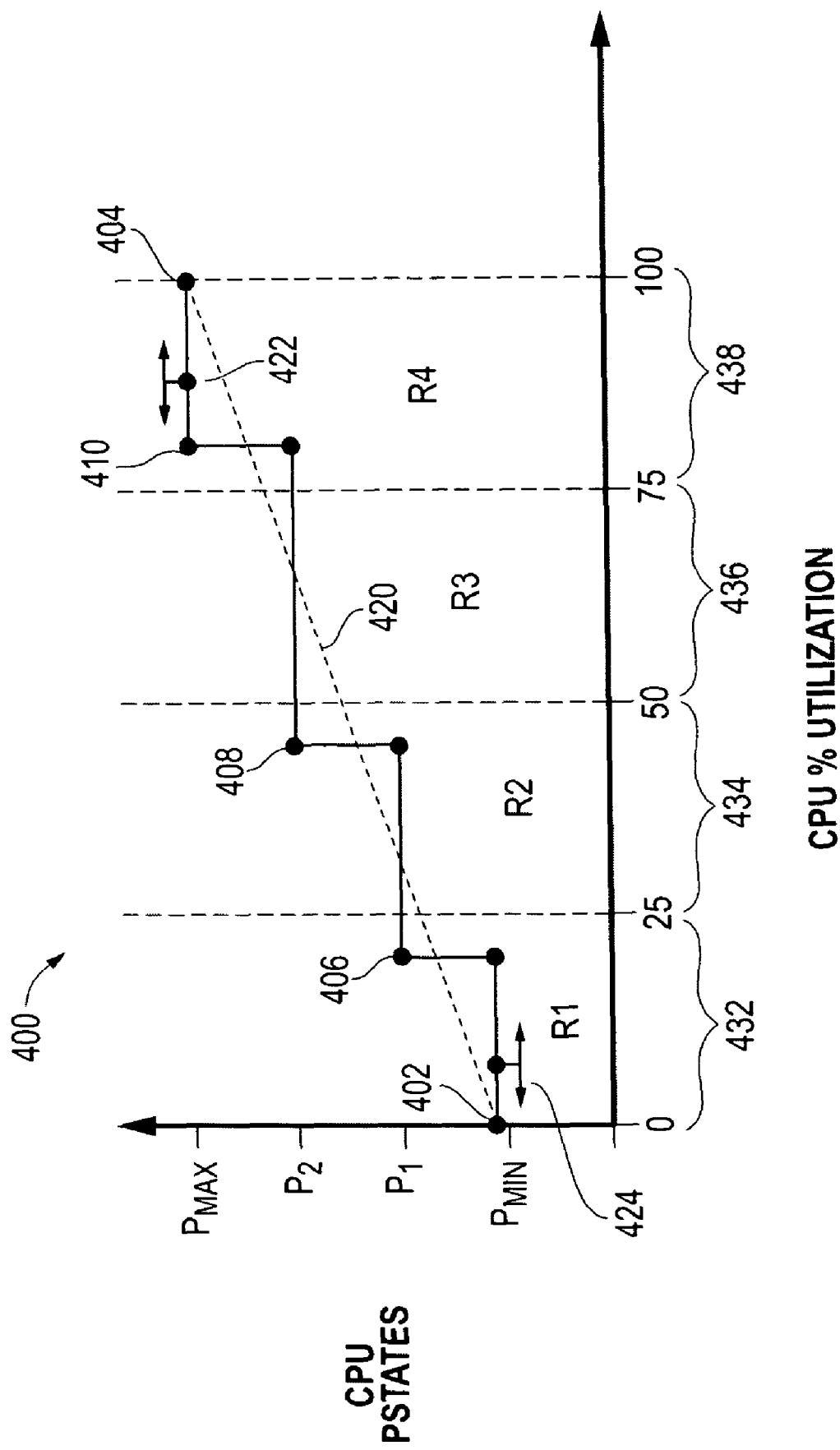
FIG. 4 is a diagram of performance state versus percent CPU (central processing unit) utilization and interrupt rate used for different regions of utilization.

FIG. 4 is a diagram 400 that uses a star-step solution and the equation above. Diagram 400 depicts performance state (PSTATE) versus percent CPU (central processing unit) utilization. The y-axis represents CPU performance states (PSTATES) from a maximum performance state ($P_{MAX}$) to a minimum performance state ($P_{MIN}$). As depicted, there are four performance states ($P_{MIN}$, $P_1$, $P_2$, $P_{MAX}$), although a different number could be used. The x-axis represents percent (%) utilization for the CPU. The dotted line 420 represents a desired performance state with respect to the CPU utilization percent. As depicted, this dotted line 420 is a linear projection for matching a performance state to the CPU utilization percent. This linear projection moves along a constant slope from the low utilization point (0%) at point 402 to a maximum utilization point (100%) at point 404. To approximate this linear projection, the performance states for the CPU can be adjusted at utilization points 406, 408 and 410. It is noted that in this embodiment, point 404 represents the MAX_UTIL in the equation above, and point 402 represents the MIN_UTIL in the equation above.

As indicated above, the minimum and maximum percent utilization values can be tracked over time rather than simply using 0% and 100% as the endpoints of the linear projection. As depicted in FIG. 4, therefore, a minimum utilization percentage point 424 can be continuously tracked, and a maximum utilization percentage point 422 can be continuously tracked. These values can move up and down during the operation of the system, as indicated by the arrows associated with the points 422 and 424 in FIG. 4. In addition, averages for these values can also be tracked and used. The dotted projection line 420 can then be continuously updated and re-calculated between these two dynamic endpoints. In this dynamic endpoint embodiment, therefore, point 422 represents the MAX_UTIL in the equation above, and point 424 represents the MIN_UTIL in the equation above. While the stair-stepping through performance states to make the changes linear is seen as an advantageous result, it is noted that other projections could also be used for dotted line 420, if desired.

With respect to the utilization measure to use for the x-axis in FIG. 4, in one embodiment, a comparison of HALTED to NON-HALTED cycles for the processor can be used as the utilization measure applied in the star-step equation. A percentage of NON-HALTED cycles out of the total number of cycles can be computed. The end points 422 and 424 can then be determined and tracked as the CPU operates. In addition, average values for these end points can be calculated and applied, if desired. The typical goal is to run the CPU near 100% utilized at all times but at the lowest PSTATE possible. If 100% of cycles in a time period (T) are NON-HALTED, it can be concluded that the PSTATE should be the maximum PSTATE ($P_{MAX}$). If 0% of cycles in a time period (T) are NON-HALTED, it can be concluded that the PSTATE should be the minimum PSTATE ($P_{MIN}$). As such, the equation $$PSTATE=ROUND\{[(P_{MAX}-P_{MIN})/(MAX\_UTIL-MIN\_UTIL)]*CPU\_UTIL+P_{MIN}\}$$

can be applied where CPU_UTIL represents the current percentage of UNHALTED cycles within a desired time period (T). In addition, MAX_UTIL can be a tracked maximum number of UNHLATED cycles as the CPU operates over a plurality of time periods (T), and MIN_UTIL can be a tracked minimum number of UNHLATED cycles as the CPU operates over a plurality of time periods (T). Again, average values can also be used. This UNHALTED technique can be implemented by determining the time spent counting the number of UNHALTED instructions over a given time period (T) for the CPU.

It is noted that the rate at which the determination is made as to what performance state (PSTATE) to set for the CPU and at which the performance verification determination is made can be adjusted depending upon the utilization level of the CPU. Further, as indicated above, utilization and performance data can be obtained from a CPU using SMI requests. However, each of these requests will take time for the CPU to process, and if it is asleep, the CPU must wake up to respond. To impact performance less, a variable frequency determine rate, such as a variable frequency SMI request rate, can be implemented based upon the current utilization. When the core is lightly utilized, having more frequent SMI requests allows utilization changes to be detected and action to be taken more quickly. While this more frequent action causes a larger performance impact, the core is already being lightly used. When the core is more highly used, having less frequent SMI requests removes some of the performance impact. While this less frequent action causes slower adjustments to utilization changes, it also reduces the likelihood that performance will be driven down at times when the CPU utilization is relatively high.

FIG. 4 depicts utilization zones 432, 434, 436 and 438 with each zone having a respective SMI request and PSTATE update frequency rate R1, R2, R3 and R4, respectively. In particular, as depicted, a first rate (R1) is used from 0 to 25 percent utilization. A second rate (R2) is used from 25 to 50 percent utilization. A third rate (R3) is used from 50 to 75 percent utilization. And a fourth rate (R4) is used from 75 to 100 percent utilization. The rates can represent, for example, the rate at which the CPU is polled to obtain utilization and performance data through SMI requests in order to perform the PSTATE selection and performance verification analyses described herein.

Using the reasoning above, the time between PSTATE updates and associated SMI requests can be selected such that R4>R3>R2>R1. In one implementation, for example, particular values can be selected, such that R1=125 ms between SMI requests, R2=250 ms between SMI requests, R3=375 ms between SMI requests, and R4=500 ms between SMI requests. The utilization and performance data obtained from the SMI requests can then be utilized for PSTATE update processing for power management.

An additional parameter that may be considered is memory bandwidth utilization. Memory bandwidth utilization represents a measure of how much of the bandwidth for communications between the memory and CPU are used during operation over a period of time. While memory bandwidth has no direct functional correlation to CPU utilization, there does appear to be an empirical correlation between memory bandwidth and CPU utilization. In general, 100% CPU utilization does not mean 100% utilization of memory bandwidth, and low CPU utilization can still drive 100% memory bandwidth. As such, memory bandwidth can be seen as a random function seeded by the CPU utilization. However, over time, what is generally seen is that 100% CPU load will drive a maximum of about 80% memory bandwidth. Due to this empirical correlation, memory bandwidth can be capped at 20% below CPU utilization, to some finite lower bound, in order to save power used in the memory input/output interface.

EXAMPLE

Advanced Power Controller (APC) Embodiment

Details for an example embodiment will now be discussed. These implementation details provide an example advanced power controller (APC) solution that analyzes CPU utilization data to select PSTATEs for a CPU and that analyzes CPU performance data to verify or validate identified changes to the PSTATE prior to actual adjustment of the PSTATE for the CPU. The APC can be used, for example, to manage the power usage of server systems within an enterprise data center. In this example, INTEL x86 processors are considered to be the CPUs being used in the servers systems.

CPU Power Management—APC manages the CPU performance by monitoring performance counters within the CPU complex (e.g., CPU and chipset) that indicates the actual load on the CPU. Additionally, APC monitors the load on the memory subsystem and dynamically adjusts the bandwidth to meet the needs of the CPU without wasting power by keeping the CPU and memory performance balanced.

CPU utilization is determined via several methods with built in heuristics to determine desired overall settings. APC computes CPU utilization by looking at the ratio of HALTED versus UN-HLATED CPU cycles over a given time window that can be determined by the Time Stamp Counter (TSC) for the CPU. HALTED cycles are counted whenever the halt (HLT) instruction is executed. This is generally done during the OS IDLE loop, when threads retire, during spin locks, etc. . . . UNHALTED instructions can be counted using the fixed performance counter MSR_CLK_UNHALTED for the CPU.

APC uses a variable sampling method based on the current CPU utilization. This is done to minimize performance impact. During higher utilization periods, the sample rate is low. During low utilization periods, the sample rate is raised higher to allow faster response to changing performance needs. SMI requests to the CPU can be used to obtain samples of CPU utilization and performance data.

APC tracks these CPU metrics and maintains an absolute value for maximum CPU utilization (MAX_UTIL), minimum CPU utilization (MIN_UTIL), and a runtime average CPU utilization (AVG_UTIL). These metrics can also be exported to higher level data center console software to aide in measuring overall data center efficiency. Additionally, these metrics can be used to help refine decision making of the APC.

As depicted in FIG. 4, APC can use a modified stair-step algorithm with variable slope to constantly improve its decision making. This technique provides a high level algorithm to determine the performance state to be used based on CPU utilization. One technique to improve how the APC adapts over time is the constantly changing slope through the use of MAX_UTIL and MIN_UTIL, which are used in the slope part of the y=mx+b equation. Over time, new minimums (MIN_UTIL) and maximums (MAX_UTIL) are observed, and these changes help the APC to refine the mapping of CPU utilization to CPU performance states by expanding the range of the performance states. As such, the same number of performance states can be stretched out wider or compressed more narrowly as new minimums and maximums are found over time. This capability helps the APC to map the needed utilization to the proper performance state.

APC can use other metrics, such as IPC and BUS transactions, to manage CPU performance and determine whether changes to PSTATEs are having the desired affect on CPU performance. IPC is a computation of instructions-per-clock. BUS is ratio of core cycles that stay within the CPU core to non-core cycles that must access external devices. IPC can be computed using the fixed performance counter CPU_CLK_RETIRED while BUS transactions can be tracked via one of the programmable performance counters using event BUS_TRANS. BUS events count all bus transactions such as memory transactions, IO transactions, deferred transactions, and other less frequent transactions such as interrupts.

These two metrics can be used to help determine if the decisions made on the base stair-step algorithm are having the impact desired. And APC can use these additional performance data points to correct itself on the fly. Once the base algorithm decides to go up in PSTATEs, it checks if the last cycle also went up. If the last decision was to go up and it resulted in an appropriate increase in the IPC, the prior added performance can be deemed to have had a positive impact. As such, continuing to increase the performance state is likely the right decision, and the APC thus decides to continue the CPU performance state increase.

In contrast, if the IPC performance did not increase as expected, then a secondary check on BUS transactions can be conducted. If BUS transactions are high, it indicates the CPU is doing more cycles outside the CPU/Cache domain and thus adding additional CPU performance would likely not translate to added system performance. APC can then decide whether to stay in the current PSTATE or increase PSTATES thereby applying more power to the system. If the IPC performance did not increase as expected and the BUS transactions are low, it likely indicates complex instructions are keeping the IPC low and in this case adding more processor performance is warranted. If the BUS transactions were high, however, it likely indicates that external bus transactions are slowing down the CPU and in this case adding more processor performance is not warranted.

In addition to receiving CPU related information through SMI requests, the APC algorithm for CPU power management can also receive input from the system BMC, which is monitoring other platform components (e.g., fans, power supply unit, input/output interfaces, memory, etc.), thereby allowing the CPU power management algorithm to operate collaboratively with platform BMC. The BMC can pass control inputs instructing the CPU power management algorithm to GO UP, GO DOWN, STAY, or DECIDE on its own the next performance state of the CPU. These additional instructions support other platform features such as power-capping.

APC can run the CPU power management algorithm on a per-CPU-core basis and can use a centralized APC manager to make socket level decisions. This means that each core in a socket runs the APC algorithm and reports back per-socket information to a centralized manager. The centralized manager can then make the decision for the socket in terms of the performance state the socket will use. APC uses this centralized manager to handle performance state coordination across all the cores in a given socket.

Memory Subsystem Bandwidth Control—APC monitors the system memory bandwidth to limit the amount of memory bandwidth needed for the given CPU utilization. Additionally, APC manages the memory subsystem from a thermal perspective to ensure the memory subsystem is operating within its design constraints. Using performance counters in the memory controller, APC can compute how much memory bandwidth is being consumed and set bounds based on CPU utilization. As indicated above, allowing excessive memory bandwidth translates to wasted power and decreases the performance-per-watt of the system. One example for memory bandwidth control is to control the number of transactions that are allowed per unit of time. Another example for memory bandwidth control is to provide memory clock manipulations such as controlling a clock duty-cycle (i.e., on/off) to only allow memory transactions during "on" cycles.

IO Subsystem Bandwidth Control—APC monitors the system IO (input/output) bandwidth and link speeds to adjust dynamically IO links to optimize power versus performance. Due to the nature of high speed IO links, often power is wasted at the physical link layer in an unwarranted fashion. APC uses intelligence to dial back link speeds when it detects an over subscribed connection and when traffic bandwidth does not warrant the link speed. This allows the APC to optimize platform power based on configuration and platform performance needs.

Fan Subsystem Control—APC monitors the fan speed to avoid excessive use of power. Fan power can become very non-linear with fan speed. Increasing the CPU (central processing unit) performance state so that it drives fan power to its non-linear region may not be the best performance-per-watt solution.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method for operating an information handling system to manage power usage, comprising:
    operating a central processing unit within an information handling system at a current performance state, the current performance state being one of a plurality of selectable performance states for the central processing unit;
    obtaining utilization data with respect to operation of the central processing unit within the information handling system;
    obtaining performance data with respect to operation of the central processing unit within the information handling system, the performance data being different at least in part from the utilization data;
    selecting a proposed performance state for the central processing unit by analyzing the utilization data;
    comparing the proposed performance state with the current performance state for the central processing unit;
    if the proposed performance state is different from the current performance state, verifying usefulness of a change to the current performance state for the central processing unit by analyzing the performance data to determine changes to performance as the central processing unit operates over time;
    changing the current performance state for the central processing unit to the proposed performance state only if usefulness of the change is verified in the verifying step; and
    periodically repeating the obtaining, selecting, comparing, verifying and changing steps to update the performance state of the central processing unit during operation of the information handling system.

2. The method of claim 1, wherein the utilization data comprises a number of unhalted cycles versus a number of halted cycles for the central processing unit over a given time period, and wherein the performance data comprises instructions per clock cycle for the central processing unit.

3. The method of claim 1, wherein the verifying step further comprises verifying as useful an upward change in performance state if the performance data indicates performance has improved for prior changes upward.

4. The method of claim 1, wherein the verifying step further comprises verifying as useful a downward change in performance state if the performance data indicates performance has not decreased for prior changes downward.

5. The method of claim 1, wherein the selecting step comprises using a linear representation of performance states across a range of values for the utilization data.

6. The method of claim 5, further comprising determining a minimum utilization data value and a maximum utilization data value over time and using these values for the linear representation.

7. The method of claim 6, further comprising using an average minimum utilization data value and an average maximum utilization data value for the linear representation.

8. The method claim 1, wherein the selecting step comprises selecting a proposed performance state based upon a relationship of a current utilization value to a target utilization value.

9. The method of claim 8, further comprising varying the target utilization value over time as the information handling system operates.

10. The method of claim 1, wherein the periodically repeating step comprises periodically repeating at a rate determined by a current utilization level for the central processing unit.

11. The method of claim 10, wherein a plurality of rates are utilized over a range of utilization levels.

12. The method of claim 11, further comprising using a progressively lower rate as the utilization level of the central processing unit increases.

13. The method of claim 1, further comprising providing a central processing unit having multiple cores and performing the obtaining, selecting, comparing, verifying, changing and periodically repeating steps for each core individually.

14. The method of claim 1, further comprising providing a central processing unit having multiple cores and performing the obtaining, selecting, comparing, verifying, changing and periodically repeating steps collectively for two or more cores.

15. The method of claim 1, wherein the obtaining steps comprising issuing a system management interrupt request to the central processing unit to obtain the utilization data and the performance data.

16. The method of claim 1, further comprising operating a plurality of operating systems on the information handling system and operating a hypervisor on the information handling system.

17. The method of claim 16, further comprising utilizing a basic input output system or a board management controller for the information handling system to perform the obtaining, selecting, comparing, verifying, changing and periodically repeating steps.

18. The method of claim 1, further comprising limiting memory bandwidth utilization based upon the utilization data for the central processing unit.

19. The method of claim 1, further comprising limiting input/output (IO) interface speeds or fan speed or both based upon the performance data for the central processing unit.

20. The method of claim 1, wherein the performance data comprises instructions per clock cycle for the central processing unit.

21. The method of claim 1, wherein the verifying step comprises utilizing instructions per clock cycle to make an initial usefulness determination and using bus transactions to make a secondary usefulness determination.

22. An information handling system having power management, comprising:
  a central processing unit within an information handling system, the central processing unit being configured to operate in one of a plurality of selectable performance states;
  a power management controller coupled to the central processing unit, the power management controller configured in operation to obtain utilization data with respect to the central processing unit, to obtain performance data with respect to the central processing unit that is different at least in part from the utilization data, to select a proposed performance state for the central processing unit by analyzing the utilization data, to compare the proposed performance state to a current performance state for the central processing unit, to verify usefulness of a change to the current performance state for the central processing unit by analyzing the performance data to determine changes to performance as the central processing unit operates, and to then set the performance state for the central processing unit to the proposed performance state if different from the current performance state only if usefulness of a change is verified;
  wherein the power management controller is further configured to periodically update the performance state of the central processing unit during operation of the information handling system.

23. The information handling system of claim 22, wherein the power management controller is configured to use a linear representation of performance states across a range of values for the utilization data to select a proposed performance state.

24. The information handling system of claim 22, wherein the power management controller is configured to use a relationship of a current utilization value to a target utilization value to select a proposed performance state.

25. The information handling system of claim 22, wherein the power management controller comprises a basic input output system or a board management controller.

26. The information handling system of claim 22, wherein the central processing unit comprises a plurality of cores and the power management controller is configured to set a performance state for each core individually.

27. The information handling system of claim 22, wherein the central processing unit comprises a plurality of cores and the power management controller is configured to set a performance state collectively for two or more cores.

28. The information handling system of claim 22, wherein the performance data comprises instructions per clock cycle for the central processing unit.

29. The information handling system of claim 28, wherein the verifying step comprises utilizing instructions per clock cycle to make an initial usefulness determination and using bus transactions to make a secondary usefulness determination.

* * * * *